(12) United States Patent (10) Patent No.: US 9,104,323 B2
Bartlett et al. (45) Date of Patent: Aug. 11, 2015

(54) APPARATUS AND METHOD FOR STORAGE CLUSTER CONTROL

(75) Inventors: Eric John Bartlett, Salisbury (GB);
Alex Stephen Howell, Hampshire (GB);
William James Scales, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 12/192,996

(22) Filed: Aug. 16, 2008

(65) Prior Publication Data

US 2009/0049210 A1 Feb. 19, 2009

(30) Foreign Application Priority Data

Aug. 16, 2007 (EP) .................................. 07114456.2

(51) Int. Cl.
*G06F 13/14* (2006.01)
*G06F 3/06* (2006.01)
*G06F 11/20* (2006.01)
*G06F 11/34* (2006.01)

(52) U.S. Cl.
CPC .............. *G06F 3/0635* (2013.01); *G06F 3/061* (2013.01); *G06F 3/0683* (2013.01); *G06F 11/2094* (2013.01); *G06F 11/3485* (2013.01)

(58) Field of Classification Search
USPC ..................................................... 710/37, 38
See application file for complete search history.

(56) References Cited

U.S. PATENT DOCUMENTS

| | | | |
|---|---|---|---|
| 5,933,824 A * | 8/1999 | DeKoning et al. ..................... 1/1 |
| 6,393,535 B1 * | 5/2002 | Burton et al. ................. 711/158 |
| 6,751,753 B2 * | 6/2004 | Nguyen et al. ................. 714/39 |
| 6,859,821 B1 * | 2/2005 | Ozzie et al. ..................... 709/205 |
| 6,950,914 B2 * | 9/2005 | Iwami et al. ................... 711/154 |
| 7,111,084 B2 * | 9/2006 | Tan et al. ......................... 710/15 |
| 7,146,467 B2 * | 12/2006 | Bearden et al. ............... 711/137 |
| 7,236,987 B1 * | 6/2007 | Faulkner et al. ...................... 1/1 |
| 7,275,103 B1 * | 9/2007 | Thrasher et al. .............. 709/224 |
| 7,290,168 B1 * | 10/2007 | DeKoning ......................... 714/9 |
| 7,318,138 B1 * | 1/2008 | Usgaonkar et al. ............ 711/163 |
| 7,383,381 B1 * | 6/2008 | Faulkner et al. .............. 711/114 |
| 7,430,568 B1 * | 9/2008 | DeKoning et al. .................... 1/1 |
| 7,447,939 B1 * | 11/2008 | Faulkner et al. .................. 714/8 |
| 7,484,050 B2 * | 1/2009 | Guha et al. ..................... 711/154 |
| 7,489,639 B2 * | 2/2009 | Breitgand et al. ............. 370/241 |
| 7,490,126 B2 * | 2/2009 | Ozzie et al. .................... 709/205 |
| 7,644,204 B2 * | 1/2010 | Marripudi et al. .............. 710/40 |
| 7,847,801 B2 * | 12/2010 | Qi ................................. 345/520 |

(Continued)

OTHER PUBLICATIONS

SCSI Primary Commands-3, 2005, Technical Committee of Accredited Standards Committee, pp. 1-496.*

*Primary Examiner* — Henry Tsai
*Assistant Examiner* — Christopher Bartels
(74) *Attorney, Agent, or Firm* — Jennifer Anda (57) ABSTRACT

Input/output (I/O) I/O target selection is achieved within a data storage system having clustered nodes of initiators, I/O targets, and grouped storage logical units. A state definition component defines access states for each combination of one or more combinations of a node, an I/O target, and a storage logical unit. A profiler component produces an access state profile for each I/O target. A rank criteria compiler compiles rank criteria as a basis for best-fit identification of I/O targets for a logical unit (LU) group. A best-fit identifier is responsive to the profile component and the rank criteria compiler and identifies a ranked best-fit order of I/O targets for an LU group. A target selector selects an I/O target for an LU group from the ranked best-fit order.

24 Claims, 3 Drawing Sheets

(56) References Cited

U.S. PATENT DOCUMENTS

| | | | |
|---|---|---|---|
| 2004/0107305 A1* | 6/2004 | Bartlett et al. | 710/36 |
| 2005/0044162 A1* | 2/2005 | Liang et al. | 709/212 |
| 2006/0112219 A1* | 5/2006 | Chawla et al. | 711/114 |
| 2007/0022138 A1* | 1/2007 | Erasani et al. | 707/104.1 |
| 2008/0086618 A1* | 4/2008 | Qi | 711/170 |
| 2008/0126615 A1* | 5/2008 | Sinclair et al. | 710/38 |
| 2008/0192996 A1 | 8/2008 | Timmer et al. | |
| 2009/0077338 A1* | 3/2009 | Agombar et al. | 711/170 |

* cited by examiner

APPARATUS AND METHOD FOR STORAGE CLUSTER CONTROL

RELATED PATENT APPLICATIONS

The present patent application claims priority under 35 USC 119 to the previously filed and presently pending United Kingdom patent application entitled "Apparatus and method for storage cluster control," filed on Aug. 16, 2007, and assigned application no. 07114456.2.

FIELD OF THE INVENTION

The present invention relates to improving control of clustered nodes in storage subsystems.

BACKGROUND OF THE INVENTION

In a storage system (such as a Storage Area Network or SAN) there can be clustered node host entities (such as a SAN Volume Controller or SVC) each with multiple I/O initiators that submit I/O. There can also be storage subsystems with multiple I/O targets that export Logical Unit (hereinafter referred to as LU) resources that service I/O requests made by the initiators.

It is known in the art to have a mechanism for coordinating LU access to prevent the performance impacts of accessing the same LU through multiple targets (known as LU thrashing). This technique requires the clustered nodes to communicate with each other to select a single target that all clustered node I/O requests for a single LU are submitted to.

However, in clustered arrangements having grouped storage LUs, there remain significant problems when asymmetric error conditions cause performance impacts on I/O activity.

SUMMARY OF THE INVENTION

The present invention relates to an apparatus and a method for storage cluster control. An apparatus of one embodiment of the invention is for input/output (I/O) target selection within a data storage system having clustered nodes of initiators, I/O targets, and grouped storage logical units. The apparatus includes a state definition component, a profiler component, a rank criteria compiler, a best-fit identifier, and a target selector. The state definition component is to define access states for each combination of one or more combinations of a node, an I/O target, and a storage logical unit. The profiler component is to produce an access state profile for each I/O target. The rank criteria compiler is to compile rank criteria as a basis for best-fit identification of I/O targets for a logical unit (LU) group. The best-fit identifier is responsive to the profile component and the rank criteria compiler to identify a ranked best-fit order of I/O targets for an LU group. The target selector is to select an I/O target for an LU group from the ranked best-fit order.

An apparatus of another embodiment of the invention is also for I/O target selection within a data storage system having clustered nodes of initiators, I/O targets, and grouped storage logical units. The apparatus includes first means for defining access states for each combination of one or more combinations of a node, an I/O target, and a storage logical unit. The apparatus includes second means for producing an access state profile for each I/O target. The apparatus includes third means for compiling rank criteria as a basis for best-fit identification of I/O targets for a logical unit (LU) group. The apparatus includes fourth means for identifying a ranked best-fit order of I/O targets for an LU group. The apparatus includes fifth means for selecting an I/O target for an LU group from the ranked best-fit order.

A method of an embodiment of the invention is for input/output (I/O) target selection within a data storage system having clustered nodes of initiators, I/O targets, and grouped storage logical units. The method defines access states for each combination of one or more combinations of a node, an I/O target, and a storage logical unit. The method produces an access state profile for each I/O target. The method compiles rank criteria as a basis for best-fit identification of I/O targets for an LU group. The method identifies a ranked best-fit order of I/O targets for an LU group. The method selects an I/O target for an LU group from said ranked best-fit order.

An article of manufacture of an embodiment of the invention has a computer program stored thereon to perform a method. The article of manufacture may be or include a tangible computer-readable medium, such as a recordable data storage medium. The computer program may be executed by one or more processors of one or more computing devices. The method performed by the computer program is for input/output (I/O) target selection within a data storage system having clustered nodes of initiators, I/O targets, and grouped storage logical units. The method defines access states for each combination of one or more combinations of a node, an I/O target, and a storage logical unit. The method produces an access state profile for each I/O target. The method compiles rank criteria as a basis for best-fit identification of I/O targets for an LU group. The method identifies a ranked best-fit order of I/O targets for an LU group. The method selects an I/O target for an LU group from said ranked best-fit order.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

One embodiment of the invention is suitably implemented in a computing system arranged with clustered nodes of initiators and having a SAN comprising storage units under the control of a storage virtualization engine or appliance. In some storage subsystems LUs are grouped together and accessing these LUs on different targets has similar I/O performance impacts as LU thrashing. This symptom could be referred to as LU group thrashing and it is an advantage of the present invention that this thrashing can be prevented by selecting a single target that all clustered node initiators can use for I/O access for all LUs in the LU group.

For each LU in the group there is an I/O access 'path' for each access Initiator-Target-LU (ITL) nexus. The specific access state of an ITL can be mapped onto Asymmetric Access States (AASs) that describe the capability of the ITL to perform I/O that vary from unable to perform I/O through varying degrees of readiness. An example is the AAS enumeration provided by the well-known SCSI Primary Commands 3 (SPC3) standard specification. However, such enumerations may be provided by other features of non-SCSI environments, and may alternatively be provided by hardware or software features written specifically to support such enumeration in any suitable system.

Figure 1:
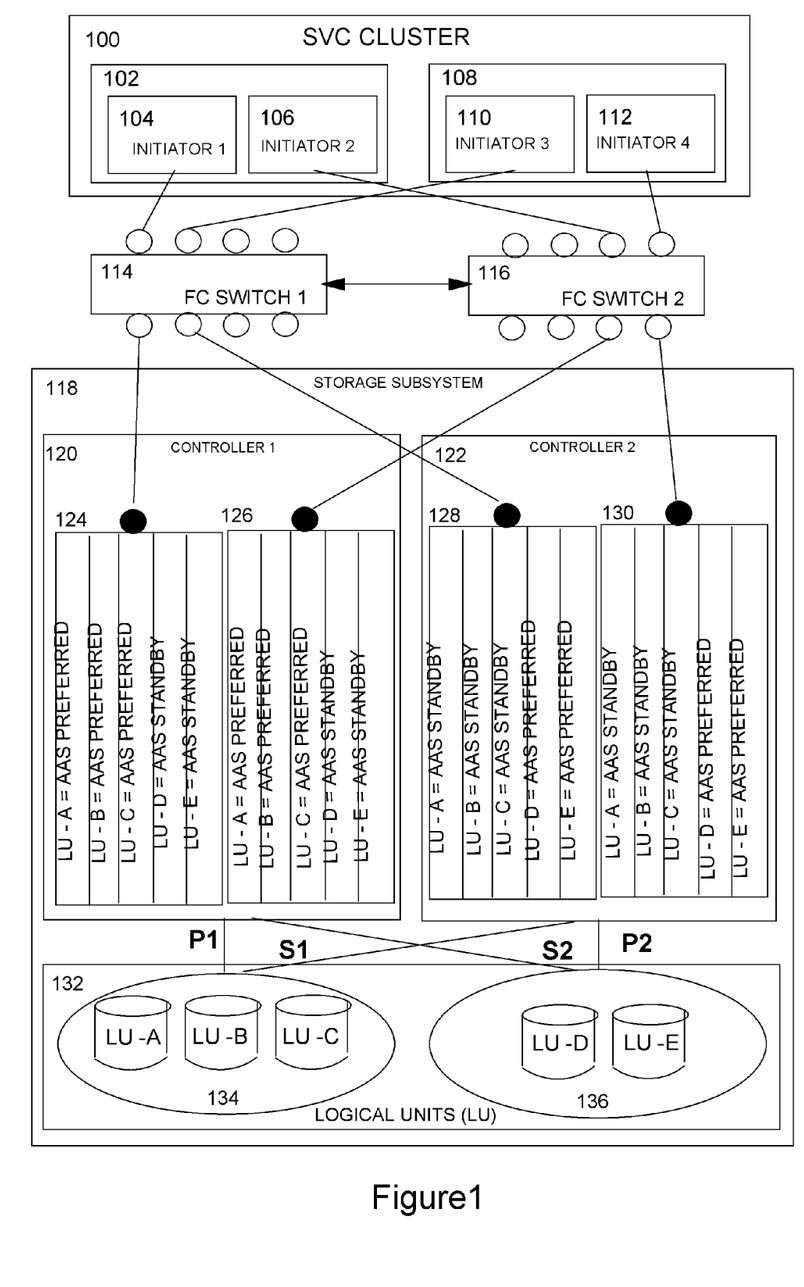
FIG. 1 shows in schematic form an arrangement of apparatus in accordance with an embodiment of the present invention.

FIG. 1 shows an exemplary system configuration for a 2 node SVC cluster and a 2 controller subsystem with 4 targets, 5 LUs and 2 LU groups. In FIG. 1 are shown an SVC cluster 100 comprising cluster node 102 and cluster node 108. Cluster node 102 comprises initiator nodes 104, 106. Cluster node 108 comprises initiator nodes 110, 112. In the exemplary arrangement shown in FIG. 1, initiator node 104 and initiator node 110 connect to ports on FC (Fiber Channel) switch 114, and initiator node 106 and initiator node 112 connect to ports on FC switch 116. FC switch 114 connects to controller port 124 (owned by controller 120) and to controller port 128 (owned by controller 122). FC switch 116 connects to controller port 126 (owned by controller 120) and to controller port 130 (owned by controller 122). Storage logical units 132 are divided into two LU groups 134, 136.

The following describes how the reported AAS states relate to the configuration for each of the LU Groups. The LUs LU-A, LU-B and LU-C form LU Group 1. LU Group 1 is 'owned' by Controller-1 and so the LUs in LU Group 1 are reported as having the preferred AAS state by the Controller 1 targets, Target 1 and Target 2 (represented by the LU group to controller association marked with a P1 in FIG. 1). The LUs in LU Group 1 are reported as having the standby AAS state by the non-owning Controller-2 targets, Target 3 and Target 4 (represented by the LU group to controller association marked with an S1 in FIG. 1).

The LUs LU-D and LU-E form LU Group 2. LU Group 2 is 'owned' by Controller-2 and so the LUs in LU Group 2 are reported as having the preferred AAS state by the Controller 2 targets, Target 3 and Target 4 (represented by the LU group to controller association marked with a P2 in FIG. 1). The LUs in LU Group 2 are reported as having the standby AAS state by the non-owning Controller-1 targets, Target 1 and Target 2 (represented by the LU group to controller association marked with an S2 in FIG. 1).

In the example the LU group 1 is owned by Controller 1 and so the Target-LU AAS states are said to be 'preferred' (as shown in FIG. 1). LU group 2 is not owned by Controller 1 and there would be some performance impact to fail over access to this Controller so the Target-LU AAS states are said to be in 'standby' (as shown in FIG. 1). The situation is reversed for Controller 2 that owns LU group 2. In this example configuration the AAS states provide the SVC nodes with the hint that for optimum I/O performance LUs LU-A, LU-B and LU-C of LU group 1 should be accessed through one of the Controller 1 targets and LUs LU-D and LU-E of LU group 2 should be accessed through the Controller 2 targets.

A SAN can have problems such as communication, hardware or software failures, and incorrect configurations. This can cause asymmetric conditions such that the ability of individual LUs to service I/O requests for the associated ITLs can be different. This can mean that only a subset of the LUs in the group can service I/O submitted by a subset of the cluster nodes through a subset of the targets. In such asymmetric failure scenarios it can be important that the clustered nodes can continue to provide the best possible I/O capability to the LU group. In order to achieve this as many of the clustered nodes as possible need to be able to access as many of the LUs in the group as possible through the designated target.

One embodiment of the present invention provides a technique for the clustered nodes to decide which storage subsystem I/O target to use for an LU group in order to maximize the I/O service capability when asymmetric failure conditions occur. In one embodiment of the invention an advantageous method is used by the clustering engine to select a target to use for an LU group. The clustered nodes that have access (at any given point in time) can then preferentially send I/O to the selected target.

Figure 2:
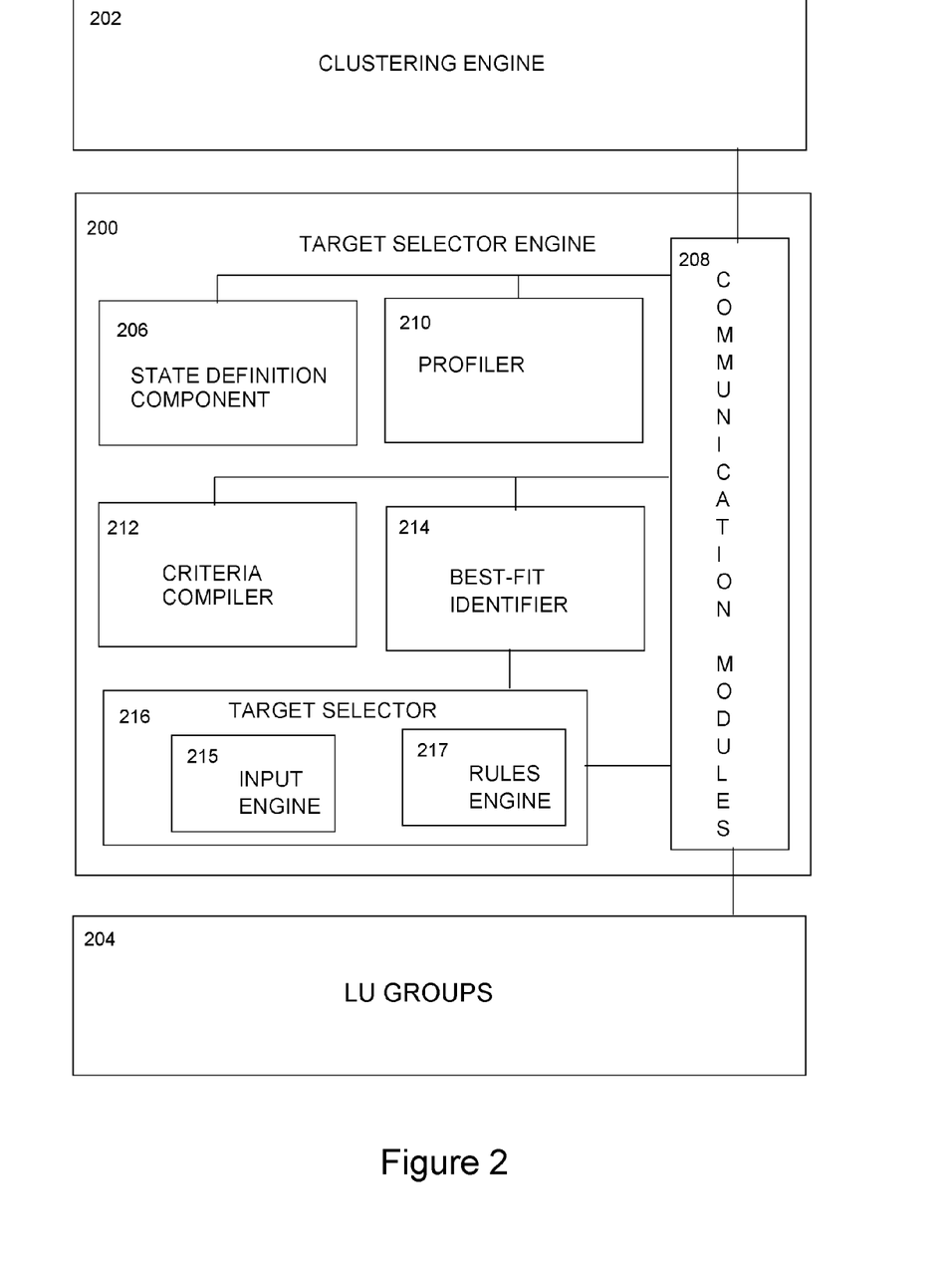
FIG. 2 shows in schematic form an apparatus or arrangement of apparatus in accordance with an embodiment of the present invention.

An exemplary apparatus or arrangement of apparatus according to an embodiment of the invention is now described, with reference to the schematic diagram of FIG. 2, in which a target selector engine 200 is in communication, using a communication module 208, with a clustering engine 202 and LU groups 204. The target selector engine comprises a state definition component 206, operable to define the AAS states described above, and a profiler 210, operable to compile the state profiles. Criteria compiler 212 is operable to compile the rank criteria which best-fit identifier 214 communicates to target selector 216, which in turn is operable to provide a selected target for LU group I/O activity as described above.

One embodiment of the present invention in the form of an apparatus or arrangement of apparatus thus advantageously addresses the problem of providing a technical means for improved control of clustered nodes in storage subsystems. The various components and mechanisms of FIG. 2 can perform the parts and steps of the method of FIG. 3 that is described later in the detailed description. Furthermore, in one embodiment, the various components and mechanisms correspond to and implement means that perform the functionality ascribed to these components and mechanisms throughout the present patent application.

Figure 3:
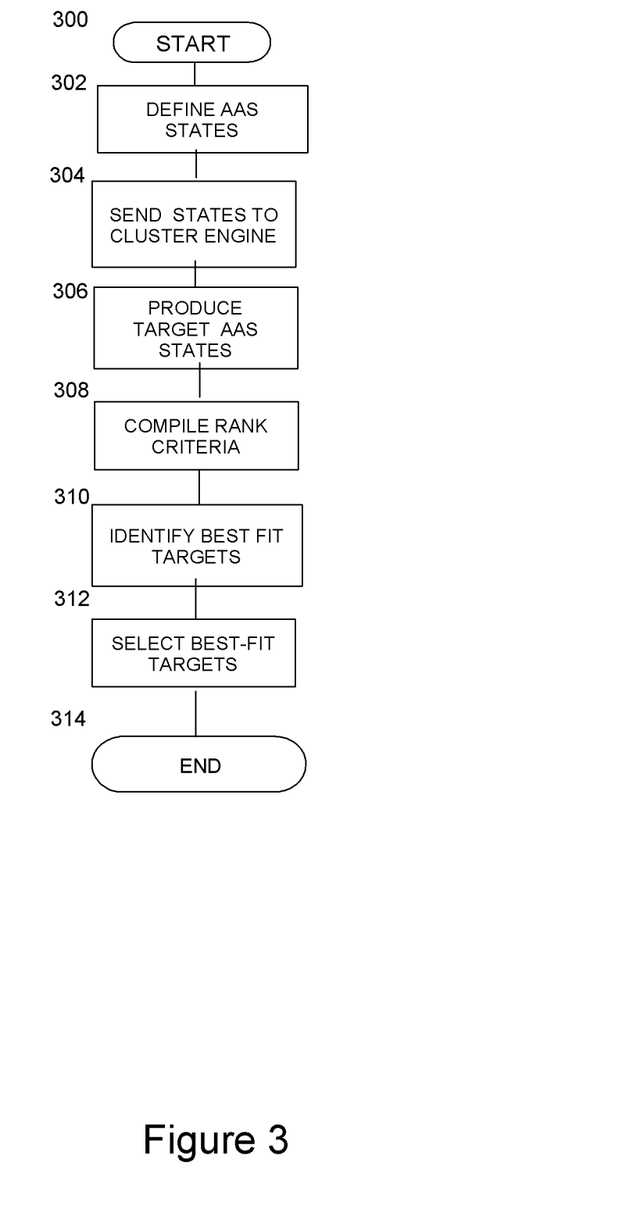
FIG. 3 shows in flowchart form one method or logic arrangement in which an embodiment of the present invention may be implemented.

A method according to one embodiment method may be broadly described as following the steps shown in FIG. 3, following the START step 300. First, in step 302, the AAS states associated with cluster Node-Target-LU (NTL, where N is a group of initiators that operate together as a cluster Node) are defined. Next, in step 304, the NTL AAS states are communicated from all cluster nodes to the clustering engine. In step 306, a target AAS state profile is produced for each target. In step 308, rank criteria compiled from the AAS states are defined in terms of desired I/O capability. In step 310, the targets with the 'best fit' of AAS states for the LU group are identified. Finally, in step 312, one of the best fit matching targets for LU group I/O submission is selected. The steps of the method end at the END step 314.

This method has the benefit that it takes into account all NTL AAS for the entire LU group and selects the target with the 'best fit' LU access. The best fit aims to achieve a balance between the following desirable I/O capability characteristics. The first characteristic is to maximize the continuation of existing I/O service availability for the LU group. The second characteristic is to maximize the post target failover I/O service availability for the LU group. The third characteristic is to maximize the post target failover I/O service reliability for the LU group. The fourth characteristic is to minimize the performance impact of target failover for the LU group.

This method also has the benefit that it is scalable to any size of LU group the system can support. This is possible as the clustering performance cost of the LU group target selection algorithm is similar to that for the same number of LUs that are independent of any group.

One embodiment of the present invention in the form of a method or logic arrangement thus advantageously addresses the problem of providing a technical means for improved control of clustered nodes in storage subsystems. The different steps of the method used by the clustering engine to select a target are now explained in more detail.

Step 1. Define the AAS States Associated with Cluster Node-Target-LU (NTL, where N is a Group of Initiators that Operate Together as a Cluster Node)

For the purposes of this LU group target selection method, only NTLs with AAS in available states are considered. This is because unavailable NTLs cannot process I/O and are therefore not considered. The notion of availability represents the capability to do I/O through the ITLs associated with the NTL context (regardless of performance penalty). If an NTL is available it can perform I/O.

An example set of available AAS states which are based on a combination of the SCSI SPC3-defined AAS states and additional SVC I/O performance status includes NTL_AAS_DEGRADED, NTL_AAS_STANDBY, NTL_AAS_READY, and NTL_AAS_PREFERRED. The state NTL_AAS_DEGRADED denotes that an NTL relationship exists but the I/O service capability is degraded. The state NTL_AAS_STANDBY denotes that an NTL relationship exists and is capable of processing I/O after a specific failover command with some failover performance impact. The state NTL_AAS_READY denotes that an NTL relationship exists and is capable of processing I/O with some failover performance impact. The state NTL_AAS_PREFERRED denotes that an NTL relationship exists and is capable of processing I/O with no failover performance impact.

This AAS enumeration is used hereafter to explain an embodiment of the present invention.

Step 2. Communicate NTL AAS States from all Cluster Nodes to the Clustering Engine The discovered NTL AAS states are reported by each cluster node for every available Target-LU nexus to the clustering engine (that is, for each NTL). During each SAN discovery cycle the access states for the node ITLs are resolved into one NTL AAS state and any NTL AAS changes reported to the clustering engine. The clustering engine records all of the NTL AAS states to build up a state map that is then made available for target port selection purposes.

Step 3. Produce a Target AAS State Profile for Each Target

This part of the method aims to build up a profile of the AAS states for a target from all the NTLs associated with the target and the LU group. The profile is generated by the clustering engine based on the NTL AAS state map that was compiled in Step 2. For each Target, counts of the LU group NTLs in each of the AAS states are summed. These counts are then stored for analysis in the decision steps 4-6. In addition, for each target, the count of paths that are presently available, online and in use that will continue to be available post failover is recorded in the target profile.

For the purposes of this invention the target profile consists of the following RAW AAS counts and COMBINED counts: RAW_DEGRADED, RAW_STANDBY, RAW_READY, RAW_PREFERRED, COMBINED_HEALTHY, COMBINED_AVAILABLE, and COMBINED_ONLINE. The RAW_DEGRADED count is the count of NTLs that are in the NTL_AAS_DEGRADED state for this target. The RAW_STANDBY count is the count of NTLs that are in the NTL_AAS_STANDBY state for this target. The RAW_READY count is the count of NTLs that are in the NTL_AAS_READY state for this target. The RAW_PREFERRED count is the count of NTLs that are in the NTL_AAS_PREFERRED state for this target. The COMBINED_HEALTHY count is equal to RAW_PREFERRED+RAW_READY+RAW_STANDBY. The COMBINED_AVAILABLE count is equal to RAW_PREFERRED+RAW_READY+RAW_STANDBY+RAW_DEGRADED. Finally, the COMBINED_ONLINE count is the count of NTLs that are presently online, available and in use, and have an available AAS state for this target.

Step 4. Define Rank Criteria Compiled from the AAS States in Terms of Desired I/O Capability The best fit targets are selected to achieve the desired I/O capability. The target AAS state profiles are used to compile rank criteria to allow the best fit target(s) to be selected. The rank criteria include RANK_ONLINE, RANK_AVAILABLE, RANK_HEALTHY, RANK_PREFERRED, RANK_READY, and RANK_STANDBY. The RANK_ONLINE criterion is equal to COMBINED_ONLINE. The RANK_AVAILABLE criterion is equal to COMBINED_ONLINE+COMBINED_AVAILABLE. The RANK_HEALTHY criterion is equal to COMBINED_ONLINE+COMBINED_AVAILABLE+COMBINED_HEALTHY. The RANK_PREFERRED criterion is equal to COMBINED_ONLINE+COMBINED_AVAILABLE+COMBINED_HEALTHY+RAW_PREFERRED. The RANK_READY criterion is equal to COMBINED_ONLINE+COMBINED_AVAILABLE+COMBINED_HEALTHY+RAW_PREFERRED+RAW_READY. The RANK_STANDBY criterion is equal to COMBINED_ONLINE+COMBINED_AVAILABLE+COMBINED_HEALTHY+RAW_PREFERRED+RAW_READY+RAW_STANDBY.

The ranks have the following effect on the desired I/O capability. The RANK_ONLINE criterion maximizes the continuation of existing I/O service availability for the LU group. The RANK_AVAILABLE criterion maximizes the post failover I/O service availability for the LU group. The RANK_HEALTHY criterion maximizes the post failover I/O service reliability for the LU group. The RANK_PREFERRED, RANK_READY, and RANK_STANDBY criteria minimize the performance impact of failover for the LU group.

Step 5. Identify the Targets with the Best Fit of AAS States for the LU Group

For a given rank the target(s) with the highest rank criteria count are said to be the best fit. Each rank is processed in turn and so the targets are progressively filtered out until only the best fit targets remain. This means that the order of application of the rank criteria defines their precedence. In one embodiment, the rank application order is, from first to last: RANK_ONLINE, RANK_AVAILABLE, RANK_HEALTHY, RANK_PREFERRED, RANK_READY, and RANK_STANDBY.

As such, the controller of one embodiment places the following priority order on the target selection decision, from most important to least important: keeping the existing availability of the LU group; making the most LU resources available; making the LU resource access the most reliable; and, having the least target failover performance impact. In a further enhancement to the system of one embodiment of the invention, the extension described below may be implemented.

Step 6. Select One of the Best Fit Targets for LU Group I/O Submission

It is possible for the set of best fit targets found in Step (5) to contain a single target or multiple targets. When the outcome is multiple best fit targets, further analysis is required to select the target to use. For example, this final decision may be based on the following additional ranking criteria. The first criterion is to choose the target based on available target I/O bandwidth, which maximizes post failover performance. The second criterion is to choose the existing selected target (if part of best fit target set), which minimizes impact of failovers that are not required. Finally, if there is still more than one best fit target then an arbitrary target can be chosen from the best fit set. For example the first target in the best fit set could be chosen.

Other Potential Methods

For step (4) other definitions for rank criteria counts may include the following. First, the rank criteria counts can include the count of LUs (Ls) that are available for all nodes (maximizes complete availability for LUs). Second, the rank criteria counts can include the count of Nodes (Ns) that have all LUs available (maximizes complete availability for Nodes).

The selection process for I/O targets may be accomplished based on user preferences input to the apparatus or arrangement of FIG. 2 using input means 215, and that a rules engine 217 or the like may be used to implement the process of target selection. All or part of the method of embodiments of the present invention may suitably and usefully be embodied in a logic apparatus, or a plurality of logic apparatus, comprising logic elements arranged to perform the steps of the method and that such logic elements may comprise hardware components, firmware components or a combination thereof.

All or part of a logic arrangement according to embodiments of the present invention may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

It can be appreciated that the method and arrangement described above may also suitably be carried out fully or partially in software running on one or more processors, and that the software may be provided in the form of one or more computer program elements carried on any suitable data-carrier such as a magnetic or optical disk or the like. Channels for the transmission of data may likewise comprise storage media of all descriptions as well as signal-carrying media, such as wired or wireless signal-carrying media.

The present invention may further suitably be embodied as a computer program product for use with a computer system. Such an implementation may comprise a series of computer-readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In an alternative, an embodiment of the present invention may be realized in the form of a computer implemented method of deploying a service comprising steps of deploying computer program code operable to, when deployed into a computer infrastructure and executed thereon, cause the computer infrastructure to perform all the steps of the method. In a further alternative, an embodiment of the present invention may be realized in the form of a data carrier having functional data thereon, the functional data comprising functional computer data structures to, when loaded into a computer system and operated upon thereby, enable the computer system to perform all the steps of the method.

It is finally noted that, although specific embodiments have been illustrated and described herein, it can be appreciated by those of ordinary skill in the art that any arrangement calculated to achieve the same purpose may be substituted for the specific embodiments shown. This application is intended to cover any adaptations or variations of embodiments of the present invention. Therefore, it is manifestly intended that this invention be limited only by the claims and equivalents thereof.

The invention claimed is:

1. An apparatus for input/output (I/O) target selection within a data storage system having clustered nodes of initiators, I/O targets, and grouped storage logical units, the apparatus comprising:

a state definition component configured to define access states for each combination of one or more combinations, each combination including a node of a plurality of the initiators, an I/O target to which the initiators of the node are able to write data, and a storage logical unit associated with the I/O target, each access state defining a readiness of the combination to perform I/O;

a profiler component configured to produce an access state profile for each I/O target;

a rank criteria compiler configured to compile rank criteria as a basis for best-fit identification of I/O targets for a logical unit (LU) group;

a best-fit identifier configured to, responsive to the profile component and the rank criteria compiler identify a ranked best-fit order of I/O targets for an LU group; and, a target selector configured to select an I/O target for an LU group from the ranked best-fit order, the selected I/O target balancing a maximization of continuing existing I/O service availability of the LU group, a maximization of a post target failover I/O service availability of the LU group, a maximization of post target failover I/O service reliability of the I/O group, and a minimization of performance impact of target failover of the I/O group.

2. The apparatus of claim 1, further comprising a communication component to communicate an output of the target selector to the clustered nodes of the initiators.

3. The apparatus of claim 1, further comprising a communication component to receive a user input to the rank criteria compiler to establish the rank criteria.

4. The apparatus of claim 1, wherein the target selector comprises a rules engine to select an I/O target for an LU group from the ranked best-fit order.

5. The apparatus of claim 1, wherein the rank criteria comprise a rank-online criterion equal to a count of LUs that are presently online, available and in use, and that are in an available state.

6. The apparatus of claim 5, wherein the rank criteria further comprise a rank-available criterion equal to a sum of the rank-online criterion, a count of LUs that are in a preferred state, a count of LUs that are in a ready state, a count of LUs that are in a standby state, and a count of LUs that are in a degraded state.

7. The apparatus of claim 6, wherein the rank criteria comprise a rank-healthy criterion equal to a sum of the rank-available criterion, the count of LUs that are in the preferred state, the count of LUs that are in the ready state, and the count of LUs that are in the standby state.

8. The apparatus of claim 7, wherein the rank criteria further comprise a rank-preferred criterion equal to a sum of the rank-healthy criterion, and the count of LUs that are in the preferred state.

9. The apparatus of claim 8, wherein the rank criteria further comprise a rank-ready criterion equal to a sum of the rank-preferred criterion, and the count of LUs that are in the ready state.

10. The apparatus of claim 9, wherein the rank criteria further comprises a rank-standby criterion equal to a sum of the rank-ready criterion, and the count of LUs that are in the standby state.

11. An apparatus for input/output (I/O) target selection within a data storage system having clustered nodes of initiators, I/O targets, and grouped storage logical units, the apparatus comprising:
first means for defining access states for each combination of one or more combinations, each combination including a node of a plurality of the initiators, an I/O target to which the initiators of the nodes are able to write data, and a storage logical unit associated with the I/O target, each access state defining a readiness of the combination to perform I/O;
second means for producing an access state profile for each I/O target;
third means for compiling rank criteria as a basis for best-fit identification of I/O targets for a logical unit (LU) group;
fourth means for identifying a ranked best-fit order of I/O targets for an LU group; and,
fifth means for selecting an I/O target for an LU group from the ranked best-fit order, the selected I/O target balancing a maximization of continuing existing I/O service availability of the LU group, a maximization of a post target failover I/O service availability of the LU group, maximization of post target failover I/O service reliability of the I/O group, and a minimization of performance impact of target failover of the I/O group.

12. The apparatus of claim 11, further comprising means for communicating an output of the target selector to the clustered nodes of the initiators.

13. The apparatus of claim 11, further comprising means for receiving a user input to the rank criteria compiler to establish one or more preferred rank criteria.

14. A method for input/output (I/O) target selection within a data storage system having clustered nodes of initiators, I/O targets, and grouped storage logical units, the method comprising:
defining access states for each combination of one or more combinations, each combination including a node of a plurality of the initiators, an I/O target to which the initiators of the node are able to write data, and a storage logical unit associated with the I/O target, each access state defining a readiness of the combination to perform I/O;
producing an access state profile for each I/O target;
compiling rank criteria as a basis for best-fit identification of I/O targets for an LU group;
identifying a ranked best-fit order of I/O targets for an LU group; and,
selecting an I/O target for an LU group from said ranked best-fit order, the selected I/O target balancing a maximization of continuing existing I/O service availability of the LU grouper maximization of a post target failover I/O service availability of the LU group, a maximization of post target failover I/O service reliability of the I/O group and a minimization of performance impact of target failover of the I/O group.

15. The method of claim 14, further comprising communicating an output resulting from selecting the I/O target to the clustered nodes of the initiators.

16. The method of claim 14, further comprising receiving a user input to establish one or more preferred rank criteria.

17. The method of claim 14, wherein selecting the I/O target is performed by a rules engine.

18. The method of claim 14, wherein the rank criteria comprise a rank-online criterion equal to a count of LUs that are presently online, available and in use, and that are in an available state.

19. The method of claim 18, wherein the rank criteria further comprise a rank-available criterion equal to a sum of the rank-online criterion, a count of LUs that are in a preferred state, a count of LUs that are in a ready state, a count of LUs that are in a standby state, and a count of LUs that are in a degraded state.

20. The method of claim 19, wherein the rank criteria comprise a rank-healthy criterion equal to a sum of the rank-available criterion, the count of LUs that are in the preferred state, the count of LUs that are in the ready state, and the count of LUs that are in the standby state.

21. The method of claim 20, wherein the rank criteria further comprise a rank-preferred criterion equal to a sum of the rank-healthy criterion, and the count of LUs that are in the preferred state.

22. The method of claim 21, wherein the rank criteria further comprise a rank-ready criterion equal to a sum of the rank-preferred criterion, and the count of LUs that are in the ready state.

23. The method of claim 22, wherein the rank criteria further comprises a rank-standby criterion equal to a sum of the rank-ready criterion, and the count of LUs that are in the standby state.

24. An article of manufacture having a computer program stored thereon to perform a method for input/output (I/O) target selection within a data storage system having clustered nodes of initiators, I/O targets, and grouped storage logical units, the method comprising:
defining access states for each combination of one or more combinations, each combination including a node of a plurality of the initiators, an I/O target to which the initiators of the node are able to write data, and a storage logical unit associated with the I/O target, each access state defining a readiness of the combination to perform I/O;

producing an access state profile for each I/O target;

compiling rank criteria as a basis for best-fit identification of I/O targets for an LU group;

identifying a ranked best-fit order of I/O targets for an LU group; and, selecting an I/O target for an LU group from said ranked best-fit order, the selected I/O target balancing a maximization of continuing existing I/O service availability of the LU grouper maximization of a post target failover I/O service availability of the LU group, a maximization of post target failover I/O service reliability of the I/O group and a minimization of performance impact of target failover of the I/O group.

\* \* \* \* \*